May 16, 1972 — J. EHRLICH — 3,663,681
METHOD FOR HANDLING CAST ARTICLES
Filed Jan. 26, 1970
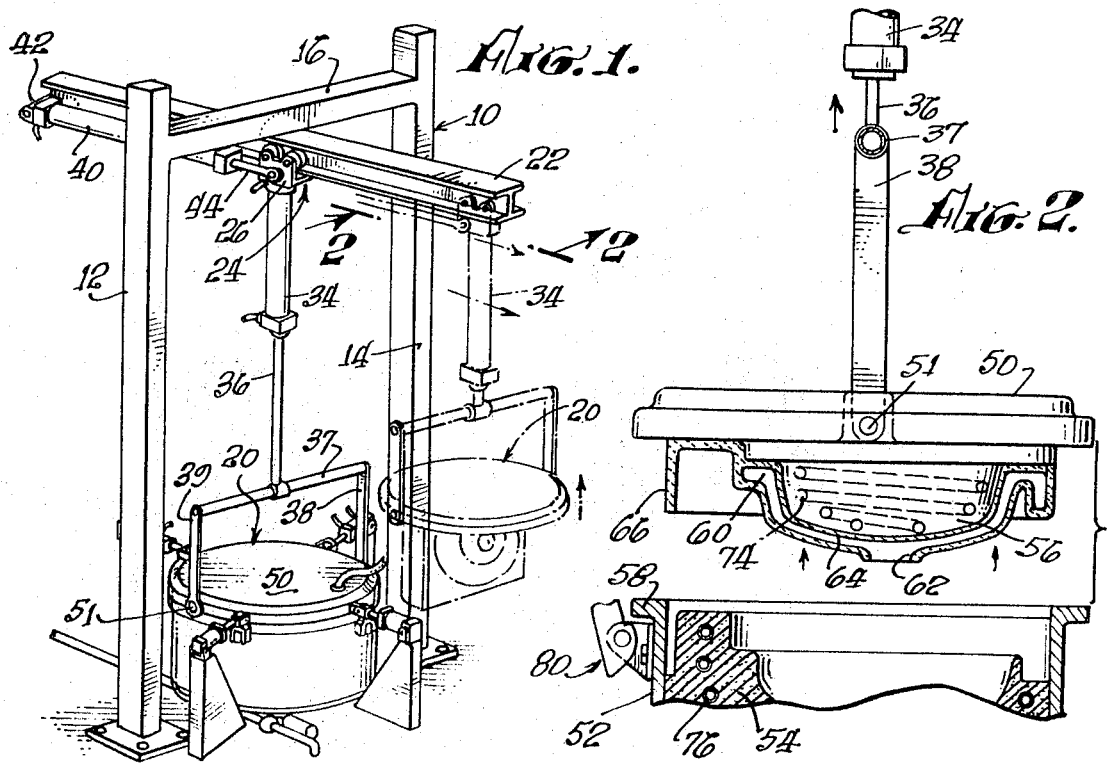
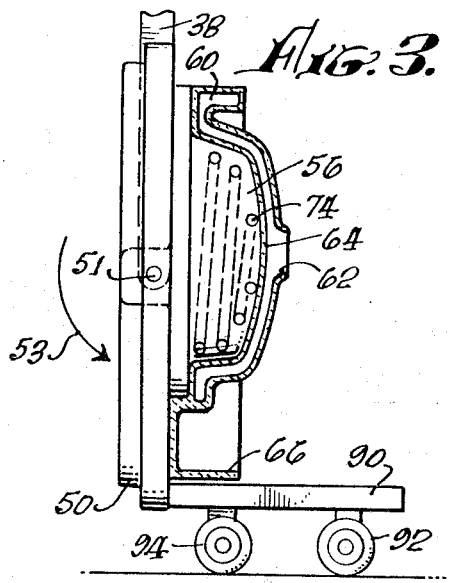
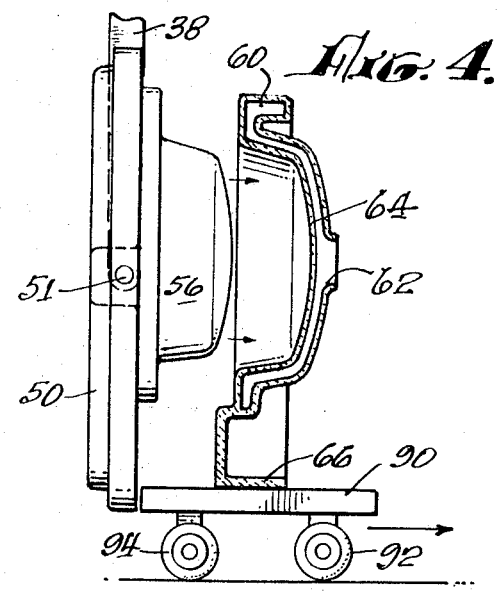
INVENTOR.
Josef Ehrlich,
by Herzig & Walsh
ATTORNEYS.

United States Patent Office 3,663,681
Patented May 16, 1972

3,663,681
METHOD FOR HANDLING CAST ARTICLES
Josef Ehrlich, Pacific Palisades, Calif., assignor to Winbrook China, Inc., Santa Monica, Calif.
Filed Jan. 26, 1970, Ser. No. 5,536
Int. Cl. B28b *1/26, 7/12*
U.S. Cl. 264—238
3 Claims

ABSTRACT OF THE DISCLOSURE

Injection molding method for molding articles, particularly ceramic articles such as square lavatories which have a flat back edge surface. The injection molding takes place at high pressure. Particular means are provided for handling the molds and for removing the top or cover of the carrier, rotating the top or cover and removing the finished cast article such that the finish piece is positioned to rest on its flat surface. The cast article is rotated through 90°, set on a movable surface and then separated from the mold cover by applying pressure which moves the article and the movable surface a small amount. The apparatus facilitates handling of the molds and makes possible rapid and repeated use of the mold and thereby greatly augments their utility.

SUMMARY OF THE INVENTION

The invention relates to an apparatus and method for molding plasticized material and in the exemplary form of the invention described herein is particularly adapted for the molding of ceramic articles having a flat back edge surface.

The invention is an improvement in an injection molding apparatus of the type that was previously described in application Ser. No. 838,229 filed July 1, 1969, of Josef Ehrlich. The improvements in this invention lie primarily in the method of handling ceramic cast articles such as square lavatories which have flat back edge surfaces. Normally, in handling articles of this type they are placed or positioned on this flat back surface.

Formerly large ceramic articles have been cast in plaster molds. The plaster dewaters the slip and also acts electrolytically on the deflocculated slip to form solid pieces. The molds such as have been known to the prior art are very heavy to handle and generally can only be used once a day. Also, in handling ceramic articles having flat back edge surfaces, a different type of handling is necessary.

It is a primary object of this invention to make it possible to form ceramic articles by injection molding in a minimum of time and further to make it possible to use the dies rapidly and repeatedly so that they are used many times per day, and further to make the handling of ceramic cast articles having flat backedge surfaces as easy and as quickly as possible.

In other words, it is an object of the invention to realize a machine capable of injection forming of ceramic articles at mass production speed with semi-skilled help and to eliminate the heavy work. Specific improvements are embodied in the apparatus whereby the above referred to objectives are realized.

In the preferred examplary form of the invention, the mold or die is suspended in a carrier which is essentially constructed to facilitate injection forming by way of injection of the slip into the molding from the bottom under very high pressure. A carrier suspended from overhead means is transportable thereby and mechanical means are provided to lift the top of the carrier to allow an operator or a mechanical means to rotate the carrier to a perpendicular position, after which the mold and the mold carrier are rested on a movable platform means. The mold is then released by pressure means from the mold carrier and transported away on the movable platform means.

Further improvements reside in the provision of the means and the method for positioning the mold and mold carrier into a perpendicular position and allowing the mold to be separated from the mold carrier and to be easily carted away.

The manner in which the foregoing objects are realized and further objects will become apparent from the following detailed description and annexed drawings wherein:

FIG. 1 is a perspective view of a preferred form of the invention;

FIG. 2 is a sectional view taken along the line 2—2 of FIG. 1;

FIG. 3 is a view showing the mold and mold carrier prior to their separation; and FIG. 4 is a view of the mold and mold carrier subsequent to their separation.

In order to facilitate realization of the objects set forth in the foregoing, means are provided for ease and convenience of handling the molds to speed up the molding process and to expedite operations using either a single mold or multiples of similar molds. In FIG. 1, numeral 10 designates a supporting structure or frame comprising uprights 12 and 14 and transverse member 16. Numeral 20 designates a mold carrier supported from the structure described, supported from the cross member 16 is a rail in the form of an I-beam 20 as shown. Numeral 24 designates a trolley comprising a U-shaped chassis 26 at the upper part of which are mounted four rollers such as shown at 30 which are journalled on shafts in a position so that the rollers can ride on the channels of the I-beam 22. The trolley 24 supports a hydraulic cylinder 34 having a stem 36 that extends vertically as shown connecting to cross-piece 37 which in turn connects to mold cover 50 by means of upright members 38 and 39 which attach to mold cover 50 at trunnions 51. Numeral 40 designates another hydraulic cylinder that is supported from the rail 22 in one end by way of a supporting bracket 42. It has a stem 44 pivotally connected to the chassis 24 whereby the cylinder 34 and the carrier supported from it can be caused to traverse along the rail 22. The hydraulic cylinders shown might, for example be air cylinders or other types of actuators.

The entire mold carrier 20 or its cover or top 50 can be lifted by the cylinder 34 as will be described.

The mold carrier is described more in detail in co-pending application 838,229 referred to above. FIG. 2 shows the mold carrier for purposes of this invention. In the exemplary form of the invention as described herein, the mold or die and its core are shown as being adapted for molding cast ware such as sanitary ceramic lavatories or the like. The mold carrier is shown at 52, the mold at 54 and the core at 56. The mold and core are made of plaster or other porous material, cast ware 60 being molded in the cavity between them and typically being ceramic ware. The carrier has an upper peripheral flange 58 to which the top 50 is clamped by clamp means 80 in a manner described in detail in co-pending application Ser. No. 838,229. The molds 54 and the carrier 52 have openings at the bottom (not shown) through which extends injection pipe means for the purposes of injecting and draining the porous material in a manner more fully explained in co-pending application Ser. No. 838,229. Tubes as shown at 74 and 76 may be provided within the core and mold for purposes that are conventional and well known in the art. Hydraulic cylinder 34 is shown with stem 36 withdrawn, thereby supporting mold cover 50, core 56 and the cast article 60 bounded by walls 62 and 64 and including flat edge surface 66.

FIG. 3 shows the mold top and cast ware after it has been rotated in a direction as shown by arrow 53, about trunnions 51 by conventional manual or electromechanical means (not shown). The cast ware device 60 bounded by walls 62 and 64 is shown positioned on its edge surface 66 and sitting on a movable surface 90 which has wheels 92 and 94. It is noted that only the cast ware device 60 is positioned on the movable surface 90 and the mold cover 50 remains supported by member 38 after it is rotated in a generally perpendicular direction about trunnion 51.

FIG. 4 shows the cast ware 60 after it has been released from the mold cover 50. Fluid is forced into tubes 74 in mold core 56 (FIG. 3) and this causes the release of the cast ware 60 from the mold cover 50 and moves the cast ware 60 and the movable surface 90 away from the mold cover 50 and the cast ware is resting on edge surface 66. At this time, movable surface 90 is moved away from the mold cover 5 and the cast ware 60 is transported to another position and the mold cover is ready to be used for making another cast piece.

From the foregoing, those skilled in the art will understand the nature and construction of the machine and its operation, which may be summarized as follows: The structure as shown in FIG. 1 provides convenient handling means for transporting mold carriers and lifting the tops and the cast ware for purposes of removing the cast ware is described more in detail in the foregoing.

FIG. 1 shows the mold carrier in a position for molding and of course injection molding or casting can be accomplished by injecting material into the cavtiy between the mold and the core. The mold top and the cast ware are rotated to a perpendicular position and the cast ware is separately supported on a movable surface. The cast ware is then released from the mold top and carted away to be stored or shipped.

From the foregoing those skilled in the art will readily observe and understand the nature and construction of the invention and the manner in which it achieves and realizes all of the objects and advantages as set forth in the foregoing as well as the many additional advantages that are apparent from the detailed description.

The foregoing disclosure is representative of a preferred form of the invention and is to be interpreted in an illustrative rather than a limited sense. The invention to be accorded the full scope of the claims appended hereto.

What I claim is:

1. A method for forming a cast article with a flat edge surface including the steps of lifting off a mold top, a mold core, and cast article from a mold carrier, rotating said mold top, core, and cast article to a position through an angle such that the flat edge surface of the cast article is down, while the top, core, and cast article are suspended setting said top, core cast article down on a movable platform means mounted on wheels with the flat surface on the platform means, injecting pressure into said core for release of said cast article from the mold core whereby the pressure separates the cast article from the core and moves the cast article and platform means away from the top and core while the top and core remains suspended.

2. A method as in claim 1, further including the step of transporting away the cast article on its platform means.

3. A method as in claim 1, including the step of rotatively supporting the top and cast article about a horizontal axis and rotating the top and the cast article about said axis.

References Cited

UNITED STATES PATENTS

| | | | |
|---|---|---|---|
| 2,632,227 | 3/1953 | Steele et al. | 264—335 X |
| 2,288,661 | 7/1942 | Wadman | 264—86 |
| 2,983,021 | 5/1961 | Maillard | 264—87 |
| 3,231,646 | 1/1966 | Conder et al. | 264—86 |
| 3,536,799 | 10/1970 | Spy | 264—86 |

ROBERT F. WHITE, Primary Examiner

A. M. SOKAL, Assistant Examiner

U.S. Cl. X.R.

25—129, Dig. 2; 264—86, 335